C. ROBINSON & J. F. ELLIS.
SNAP-HOOK.
No. 191,472. Patented May 29, 1877.
Fig.1.
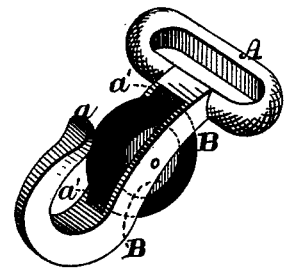
Fig.2. Fig.3.
 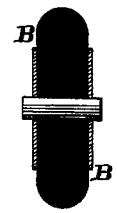
Fig.4.
WITNESSES.
Jas. C. Hutchinson
Henry G. Hazard
INVENTORS.
C. Robinson and J. F. Ellis, by
Prindle and Caxtein Attys

UNITED STATES PATENT OFFICE.

CLARK ROBINSON AND JOSEPH F. ELLIS, OF EAU CLAIRE, WISCONSIN.

IMPROVEMENT IN SNAP-HOOKS.

Specification forming part of Letters Patent No. 191,472, dated May 29, 1877; application filed April 6, 1877.

*To all whom it may concern:*

Be it known that we, CLARK ROBINSON and JOSEPH F. ELLIS, of Eau Claire, in the county of Eau Claire and in the State of Wisconsin, have invented certain new and useful Improvements in Snap-Hooks; and do hereby declare that the following is a full, clear, and exact description thereof, reference being had to the accompanying drawing, making a part of this specification, in which—

Figure 1 is a perspective view of a hook containing our improvement, and Figs. 2, 3, and 4 are transverse central sections of the wheel, showing different methods of combining the rubber and metal.

Letters of like name and kind refer to like parts in each of the figures.

The design of our invention is to increase the efficiency and ease of operation of the various hooks used upon or in connection with harness; and to this end it consists, as an improved article of manufacture, in a hook provided with a guard-wheel which has a yielding periphery, substantially as and for the purpose hereinafter specified.

In the annexed drawing, A represents a hook of the form ordinarily used in connection with hitching-straps, holdback-straps, &c., within the shank of which, opposite to the point $a$, is provided a longitudinal slot, $a'$, that receives and contains a wheel, B, which is pivoted therein.

The wheel B has its periphery composed of rubber or other elastic material, and has such size as to leave between the point $a$ and said periphery a space which is less than the transverse diameter of the ring, rein, or other part that is to be received by the hook.

As thus constructed, it will be seen that in passing a rein or ring into the hook A, the periphery of the wheel B will be compressed at its point of contact with said part sufficiently to permit the latter to pass between the same and the point $a$, and that, during such operation, said wheel will turn so as to form a rolling pressure-bearing, and prevent the friction which would result if such bearing was stationary.

When the rein or ring is contained within the bow of the hook, the wheel operates as a stop and prevents the accidental disconnection of said parts.

The wheel B may be constructed with a metal center and rubber-band periphery, as shown in Fig. 2. It may be composed entirely of rubber and have metal washers upon its sides, as seen in Fig. 3, or it may be constructed from rubber, and have an eyelet at its center, as shown in Fig. 4.

The principle involved in this invention is especially applicable to all forms of hooks used upon or in connection with harness, but may also be applied to any form or kind of hook that is constructed.

Having thus fully set forth the nature and merits of our invention, what we claim is—

As an improved article of manufacture, the hook A, having pivoted within its shank opposite to its point $a$ a wheel, B, provided with an elastic yielding periphery, substantially as and for the purpose specified.

In testimony that we claim the foregoing we have hereunto set our hands this 30th day of March, 1877.

CLARK ROBINSON.
JOSEPH F. ELLIS.

Witnesses:
ABEL DAVIS,
E. G. JORDAN.